United States Patent
Sohn et al.

(10) Patent No.: US 9,398,234 B2
(45) Date of Patent: Jul. 19, 2016

(54) ELECTRONIC DEVICE AND METHOD FOR PROCESSING IMAGE THEREOF

(71) Applicant: Samsung Electronics Co., Ltd., Gyeonggi-do (KR)

(72) Inventors: Jaesik Sohn, Gyeonggi-do (KR); Kihuk Lee, Gyeonggi-do (KR); Youngkwon Yoon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/546,083

(22) Filed: Nov. 18, 2014

(65) Prior Publication Data

US 2015/0139495 A1    May 21, 2015

(30) Foreign Application Priority Data

Nov. 20, 2013    (KR) .................. 10-2013-0141375

(51) Int. Cl.
*G06K 9/00* (2006.01)
*H04N 5/265* (2006.01)
*G06T 7/20* (2006.01)
*H04N 5/232* (2006.01)

(52) U.S. Cl.
CPC .............. *H04N 5/265* (2013.01); *G06T 7/2006* (2013.01); *H04N 5/23222* (2013.01)

(58) Field of Classification Search
CPC combination set(s) only.
See application file for complete search history.

(56) References Cited

U.S. PATENT DOCUMENTS

| | | | |
|---|---|---|---|
| 5,956,083 A | 9/1999 | Taylor et al. | |
| 6,356,313 B1 * | 3/2002 | Champion | G09G 5/00 348/558 |
| 7,072,398 B2 * | 7/2006 | Ma | H04N 19/51 348/416.1 |
| 7,167,179 B2 * | 1/2007 | Nozawa | H04N 5/262 345/473 |
| 7,525,557 B2 * | 4/2009 | Sukeno | H04N 5/272 345/629 |
| 2001/0013869 A1 * | 8/2001 | Nozawa | H04N 5/262 345/473 |
| 2006/0170692 A1 * | 8/2006 | Sukeno | H04N 5/272 345/547 |
| 2010/0309209 A1 * | 12/2010 | Hodgins | G06T 13/40 345/473 |

* cited by examiner

*Primary Examiner* — Anand Bhatnagar
(74) *Attorney, Agent, or Firm* — Cha & Reiter, LLC.

(57) ABSTRACT

A method for processing an image of an electronic device is provided, which includes detecting at least one motion object from image information. When there are two motion objects, determining whether the motion objects are separated from or combined with each other. At least one motion object is extracted the motion objects are separated from or combined with each other, determining whether or not there is a preset motion object synthesis sequence, and recommending a synthesis time point before and after a time point of separation or combination of the motion objects.

17 Claims, 8 Drawing Sheets

ELECTRONIC DEVICE AND METHOD FOR PROCESSING IMAGE THEREOF

CLAIM OF PRIORITY

This application claims the benefit under 35 U.S.C. §119 (a) from a Korean patent application filed on Nov. 20, 2013 in the Korean Intellectual Property Office and assigned Serial No. 10-2013-0141375, the entire disclosure of which is hereby incorporated by reference in its entirety.

BACKGROUND

1. Field of the Invention

The present disclosure relates to a method for synthesizing moving objects, a method for processing an image regarding a synthesis time point, and an electronic device using the same.

2. Description of the Related Art

In general, electronic devices such as a smart phone, a tablet PC, a Portable Multimedia Player (PMP), a Personal Digital Assistant (PDA), a Laptop Personal Computer (Laptop PC), and wearable devices, such as a wrist watch or a Head-Mounted Display (HMD), that have been recently manufactured typically include much than a phone function but also other various functions such as (e.g., a Social Network Service (SNS), Internet, multimedia, and photo moving image capturing and execution).

In particular, among such various functions, an image processing technology that tracks a moving object using a camera and expresses a continuous operation of the moving object has been researched and developed. However, in the related art, overlapping or separation of moving objects may occur according to their displacement, and thus it is difficult to control image processing or image capturing for synthesis only with respect to objects that do not overlap each other.

SUMMARY

The present disclosure provides an electronic device and a method for processing an image thereof, which can control a synthesis time point and a method for synthesizing moving objects.

In accordance with an aspect of the present disclosure, a method for processing an image of an electronic device may include detecting at least one motion object from image information. if there are two or more motion objects, determining whether the at least one motion objects are separated from or combined with another image motion; extracting the motion objects if the motion objects are separated from or combined with each other; determining whether or not there is a preset motion object synthesis sequence; and recommending a synthesis time point before and after a time point of separation or combination of the motion objects.

In addition, method for processing an image of an electronic device, may include: detecting at least a first motion object from image information; determining whether the at least a first motion object is separated from or combined with a second motion object; extracting the at least first motion object if the at least a first motion object is separated from or combined with the second motion object; determining whether or not there is a preset motion object synthesis sequence; and recommending a synthesis time point before and after a time point of separation or combination of the first motion object.

In accordance with another aspect of the present disclosure, an electronic device may include a camera unit that acquires and transmits an input image as image information; a control unit that receives the image information and detects at least one motion object from the image information, when there are two or more motion objects determines whether the two or more motion objects are separated from or combined with each other, extracts the motion objects if the two or more motion objects are separated from or combined with each other, the control unit determines whether or not there is a preset motion object synthesis sequence, and recommends a synthesis time point before and after a time point of separation or combination of the motion objects; and a display unit that displays the synthesized motion object as an image.

In addition, the detecting of at least a first motion object includes determining the object as the motion object if a vector change amount of the object is changed to be equal to or larger than a specific value using a motion vector According to the electronic device and the method for processing an image thereof according to the present disclosure, it is possible to control the synthesis time point and the method for synthesizing images of the moving objects, and thus a user can acquire various images.

DETAILED DESCRIPTION

Hereinafter, preferred embodiments of the present disclosure will now be described in detail with reference to the accompanying drawings. In the accompanying drawings, the same reference numerals are used for the same elements. Further, detailed description of well-known functions and structures incorporated herein may be omitted to avoid obscuring appreciation by a person of ordinary skill in the art of the subject matter of the present disclosure. In the following description of the present disclosure, only portions that aid in understanding the operations according to various embodiments of the present disclosure are described, and explanation of other portions may be omitted to avoid obscuring the subject matter of the present disclosure.

Figure 1:
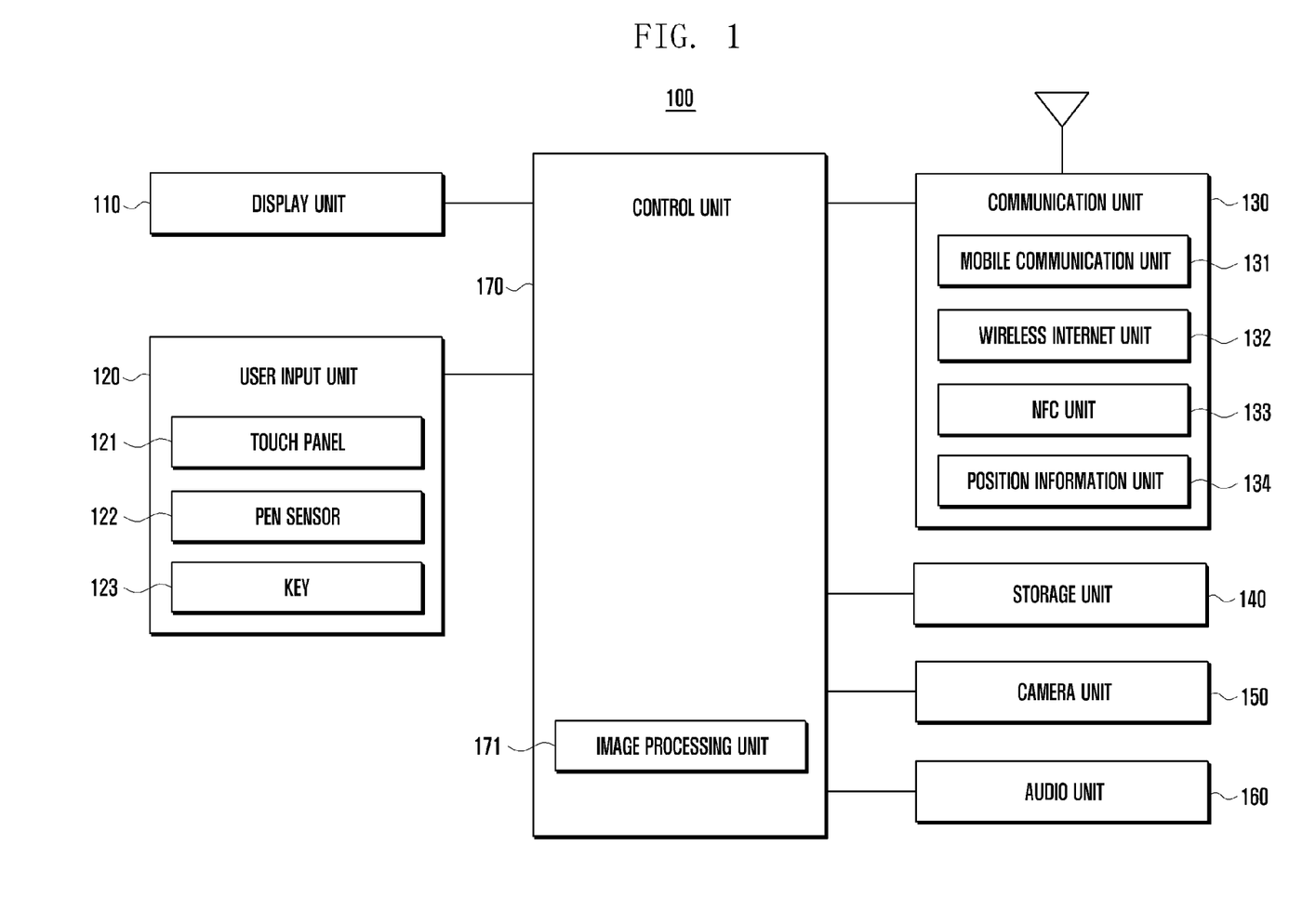
FIG. 1 is a block diagram illustrating the configuration of an electronic device according to an embodiment of the present disclosure.

FIG. 1 is a block diagram illustrating the configuration of an exemplary electronic device 100 according to an embodiment of the present disclosure.

The configuration of an electronic device 100 according to an embodiment of the present disclosure may be applied to a smart phone, but is not limited thereto. The configuration of the electronic device 100 may be applied to various devices. For example, the configuration of the electronic device 100 may be applied to a tablet PC, a Portable Multimedia Player (PMP), a Personal Digital Assistant (PDA), a Laptop Personal Computer (Laptop PC), and a wearable device, such as a wrist watch or a Head-Mounted Display (HMD), just to name a few of the many non-limiting possibilities.

The electronic device 100 may include, for example, a display unit 110, a user input unit 120, a communication unit 130, a non-transitory storage unit 140, a camera unit 150, an audio unit 160, and a control unit 170.

The display unit 110 may function to display an image or data to a user. The display unit 110 may include a display panel. As the display panel, for example, a Liquid Crystal Display (LCD) or an Active-Matrix Organic Light-Emitting Diode (AM-OLED) may be used. In this case, the display unit 110 may further include a controller that controls the display panel. The display panel may be implemented to be flexible, transparent, or wearable.

On the other hand, the display unit 110 may be combined with a touch panel 121 and may be provided in the form of a touch screen. For example, the touch screen may include an integrated module having a structure in which the display panel and the touch panel are both laminated.

The user input unit 120 may receive an input of various commands from a user. The user input unit 120 may include, for example, at least one of a touch panel 121, a pen sensor 122, and a key 123.

With continued reference to the user input unit 120 of FIG. 1, the touch panel 121 can recognize a user's touch input in at least one of capacitive, resistive, infrared, and ultrasound methods. The touch panel 121 may further include a controller (not illustrated). In the case of the capacitive method, proximity recognition (near-touch) is also possible in addition to direct touch. The touch panel 121 may further include a tactile layer. In this case, the touch panel 121 can provide a tactile reaction to a user. The pen sensor 122 may be implemented, for example, using a separate sheet for recognizing a pen in the same manner as receiving the user's touch input. The key 123 may include a mechanical key or a touch key. The mechanical key may include, for example, at least one of a power button that is provided on one side of the electronic device to turn on the display of the electronic device 100 when the power button is pushed, at least one volume button that is positioned on the other side of the electronic device 100 to control the volume when the volume button is pushed, and a home button that is provided in the center of a lower end of the display unit 110 of the electronic device 100 to shift to a home screen when the home button is pushed. The touch key 123 may include, for example, at least one of a menu key that is provided on one surface of the lower end of the display unit 110 of the electronic device 100 to provide a menu related to content that is currently being displayed when the menu key is pushed, and/or a return key that is provided on the other surface of the lower end of the display unit 110 of the electronic device 100 to return to a previous screen of the currently displayed screen when the return key is pressed. According to an exemplary embodiment, the display unit 110 displays a search interface that is transmitted from the control unit 170. The touch panel 121 may sense a touch event for inputting a keyword and/or a touch event for selecting tag information.

With continued reference to FIG. 1, the communication unit 130 may include at least one of a mobile communication unit 131, a wireless Internet unit 132, a Near Field Communication (NFC) unit 133, and a position information unit 134. Hardware such as a transceiver, transmitter or receiver and an antenna may be included in the communication unit.

The mobile communication unit 131 transmits/receives a wireless signal to/from at least one of a base station, an external terminal, and a server on a mobile communication network. The wireless signal may include a voice call signal, a video call signal, or various types of data according to transmission/reception of a text/multimedia message.

The wireless Internet unit 132 functions to connect to the wireless Internet. As the wireless Internet technology, wireless LAN (WLAN) (Wi-Fi), Wireless broadband (Wibro), World interoperability for microwave access (Wimax), or High Speed Downlink Packet Access (HSDPA) may be used. just to name some non-limiting possibilities.

The NFC unit 133 functions to perform NFC communication. As the NFC technology, Bluetooth, Radio Frequency Identification (RFID), Infrared Data Association (IrDA), Ultra Wideband (UWB), or ZigBee may be used.

The position information unit 134 functions to acquire or confirm the position of the mobile terminal. The position information unit 134 may acquire position information using, for example, a Global Navigation Satellite System (GNSS). Here, the GNSS is a term that is used to explain wireless navigation satellite systems that go around the earth and send reference signals for enabling predetermined types of wireless navigation receivers to determine their positions on the ground surface or in the vicinity of the ground surface. The GNSS may be Global Position System (GPS) operated in USA, Galileo operated in Europe, Global Orbiting Navigational Satellite System (GLONASS) operated in Russia, COMPASS operated in China, or Quasi-Zenith Satellite System (QZSS) operated in Japan.

In addition, the communication unit 130 may include a network interface (e.g., LAN card) or a modem for connecting the electronic device 100 to a network (e.g., Internet, Local Area Network (LAN), Wire Area Network (WAN), telecommunication network, cellular network, satellite network, or Plain Old Telephone Service (POTS)).

The storage unit 140 may include at least one of an internal memory and an external memory including a non-transitory storage format.

The internal memory may include, for example, at least one of a volatile memory (e.g., a Dynamic RAM (DRAM), a Static RAM (SRAM), or a Synchronous Dynamic RAM (SDRAM), a nonvolatile memory (e.g., a One Time Programmable ROM (OTROM), a Programmable ROM (PROM), an Erasable and Programmable ROM (EPROM), an Electrically Erasable and Programmable ROM (EEPROM), a mask ROM, or a flash ROM), a Hard Disk Drive (HDD), or a Solid State Drive (SSD). According to an embodiment, the control unit 170 can load and process a command or data that is received from at least one of the nonvolatile memory or other constituent elements in the volatile memory. Further, the control unit 170 may receive data from other constituent elements or store generated data in the nonvolatile memory.

The external memory may include at least one of a Compact Flash (CF), a Secure Digital (SD), a Micro Secure Digital (Micro-SD), a Mini Secure Digital (Mini-SD), an extreme Digital (xD), and a memory stick, just to name some non-limiting possibilities.

The storage unit 140 may store an operating system that controls resources of the electronic device 100 and application programs for operating applications. The operating system may include a kernel, middleware, and API. For example, the operating system may be an Android, iOS, Windows, Symbian, Tizen, or Bada operation system, just to name some non-limiting possibilities.

The kernel may include a system resource manager that can manage the resources and a device driver. The resource manager may include, for example, a control unit management unit, a memory unit management unit, or a file system management unit to perform control of system resources, allocation or recovery. The device driver may access and control various constituent elements of the electronic device 100 by software. For this, the device driver may be divided into an interface and a portion of individual driver modules provided by respective hardware providers. The device driver may include, for example, at least one of a display driver, a camera driver, a Bluetooth driver, a shared memory driver, a USB driver, a keypad driver, a Wi-Fi driver, an audio driver, and an Inter-Process Communication (IPC) driver.

The middleware may be configured to include a plurality of modules that are pre-implemented to provide functions that are commonly necessary to various applications. The middleware may provide commonly necessary functions through the API so that applications can efficiently use limited system resources in the electronic device. The middleware may include, for example, at least one of an application manager, a Window manager, a multimedia manager, a resource manager, a power manager, a database manager, and a package manager. Further, according to implementation examples, the middleware may include at least one of a connectivity manager, a notification manager, a location manager, a graphic manager, and a security manager. Further, according to implementation examples, the middleware may include a runtime library or other library modules. The runtime library is a library module that a compiler uses to add a new function through a programming language while an application is executed. For example, the runtime library may perform input/output, memory management, or arithmetic function. The middleware may generate and use a new middleware module through a combination of various functions of internal constituent element modules as described above. On the other hand, the middleware may provide specified modules by kinds of operating systems in order to provide specified functions.

The API is a set of API programming functions, and may be provided with different configurations according to the operating systems. For example, in the case of Android or iOS, one API set may be provided by platforms, and in the case of Tizen, two or more API sets may be provided.

An application may perform at least one function using an application program. The application may be divided into a preloaded application and a third party application. The application may be, for example, a home screen application that executes a home screen, a dialer application, a Short Message Service (SMS)/Multimedia Message Service (MMS) application, an Instant Message (IM) application, a browser application, a camera application, an alarm application, a content or address book application, a voice dial application, an e-mail application, a diary application, a media player, an album application, or a watch application, just to name a few non-limiting possibilities.

With continued reference to FIG. 1, the camera unit 150 may capture an image and a moving image, and according to implementation example, may include at least one image sensor (e.g., front lens or rear lens), an Image Signal Processor (ISP) (not illustrated) and/or flash LED (not illustrated), just to name a few non-limiting possibilities.

On the other hand, the camera unit 150 may be configured to include at least a part of the control unit 170. For example, the camera unit 150 may also perform correction of an image or calculation of image features in addition to acquisition of an image. In this case, the camera module 150 may comprise a functional module having a hardware module and a software module that interact.

The audio unit 160 may bidirectionally convert a voice and an electrical signal. The audio unit 160 may include, for example, at least one of a speaker, a receiver, an earphone, and a microphone, and may convert audio information that is input or output.

The control unit 170 may include an image processing unit 171. The control unit 170 may control a plurality of hardware and software constituent elements connected to the control unit 170 and may process and operate various kinds of data including multimedia data through driving of the operating system and application programs. The control unit 170 may be implemented by, for example, System on Chip (SoC), and may further include a Graphic Processing Unit (GPU).

The camera unit 150 transmits the acquired input image to the control unit 170 as image information. The control unit 170 receives the image information and detects at least one motion object from the image information that is acquired from the camera unit 150. The control unit 170 detects at least one moving object from the image information. In an embodiment, the control unit 170 determines whether there is at least one moving object in the image information that is acquired from the camera unit 150, and detects the existence of the at least one moving object. Here, in determining the motion of the object using a motion vector, the motion control unit 170 determines an object to be a motion object if the change amount of the vector (displacement and direction) of the object under determination becomes equal to or larger than a specific value (e.g., threshold value). For example, if at least one of the displacement and the direction of the object is changed to be equal to or larger than the specific value, the control unit 170 determines the object as the motion object in order to detect the motion object.

If the at least one motion object is detected, the control unit 170 tracks movement of the at least one motion object. If the at least one motion object is detected, the control unit 170 tracks the movement displacement and direction of the at least one motion object. In an embodiment, the control unit 170 may track the displacement and the direction of the at least one motion object using a Kanade-Lucas-Tomasi (KLT) feature tracking method. In an embodiment, if a new motion vector is extracted in addition to the tracked object during tracking of the at least one motion object, the control unit 170 determines that there are (at least) two motion objects that are separated from each other. In an embodiment, if a new moving object is sensed (e.g., if the number of motion objects is increased) in addition to the object that is tracked in a tracking region during the tracking of the at least one motion object, the control unit 170 determines a corresponding time point as a time point when the motion objects are separated from each other. As indicated previously, the "at least one motion object" may be referred to as "at least a first motion object".

In an embodiment, if the motion vector is changed to be equal to or smaller than a specific value during the tracking of the at least one motion object, the control unit 170 determines that the motion objects (such as the first and second motion objects) are combined with each other. If the at least one motion object enters into a tracking region of another motion object (e.g., if the number of motion objects is decreased) during the tracking of the motion object, the control unit 170 determines the corresponding time point as a time point when the motion objects are combined with each other.

The control unit 170 may extract the at least one motion object being tracked. In an embodiment, the control unit 170 may extract the motion object by frames (e.g., still image of the motion object) through determination of the vector of the at least one motion object being tracked.

In addition, the control unit 170 may synthesize the extracted motion objects. In an embodiment, if the separation or combination of the objects does not occur, the control unit 170 synthesizes the movement of the motion objects in which the motion vector is changed to be equal to or larger than the specific value to generate one image. The control unit 170 may synthesize the objects that move at a standstill (e.g., the objects of which the positions are not changed, but the directions are changed) to produce one image by making the moving objects overlap each other. When the control unit 170 synthesizes the moving objects that move at a standstill (e.g., the objects of which the positions are not changed, but the directions are changed) to produce one image by making the moving objects overlap each other, the control unit 170 may synthesize respective frames of the image with semi-transparency or blending. In this case, the degree of semi-transparency or blending of the respective frames of the image may be changed according to a weight (e.g., speed or time). The objects having moving positions may be synthesized to produce one image through making the objects not overlap (separated from) each other.

In an embodiment, if the separation or combination of the motion objects occur, the control unit 170 synthesizes the movement of the motion objects in which the motion vector is changed to be equal to or larger than the specific value to generate one image. The control unit 170 may synthesize the objects that move at a standstill (e.g., the objects of which the positions are not changed, but the directions are changed) to produce one image by making the moving objects overlap each other. When the control unit 170 synthesizes the moving objects that move at a standstill (e.g., the objects of which the positions are not changed, but the directions are changed) to produce one image by making the moving objects overlap each other, the control unit 170 may synthesize respective frames of the image with semi-transparency or blending. In this case, the degree of semi-transparency or blending of the respective frames of the image may be changed according to the weight (e.g., speed or time). The objects having the moving positions may be synthesized to produce one image through making the objects not overlap (separated from) each other.

If there is a preset motion object synthesis sequence (e.g., if there is only motion object synthesis before a time point of the separation or combination of the motion objects, if there is only the motion object synthesis after the time point of the separation or combination of the at least one motion object, or if there is the motion object synthesis before and after the time point of the separation or combination of the motion objects), the control unit 170 may synthesize motion objects to produce one image according to the synthesis sequence.

If there is not the preset motion object synthesis sequence, the control unit 170 may recommend the synthesis time point before and after the time point of the separation or combination of the motion objects. If a specific synthesis time point is selected among the recommended synthesis time points, the control unit 170 may synthesize the motion objects according to the selected synthesis time point.

The control unit 170 may transfer the synthesized image to the storage unit 140, and the storage unit 140 stores the transferred synthesized image under the control of the control unit 170. The control unit 170 may transfer detecting, tracking, and extracting processes of the motion objects to the display unit 110, and the display unit 110 may display the transferred detecting, tracking, and extracting processes of the motion objects. A user can confirm the detecting, tracking, and extracting processes of the motion objects displayed on the display unit 110. The control unit 170 may transfer the synthesis time point of the motion object, a recommended screen of the synthesis time point, and the synthesized image to the display unit 110, and the display unit 110 may display the transferred synthesis time point of the motion object, the recommended screen of the synthesis time point, and the synthesized image.

Figure 2:
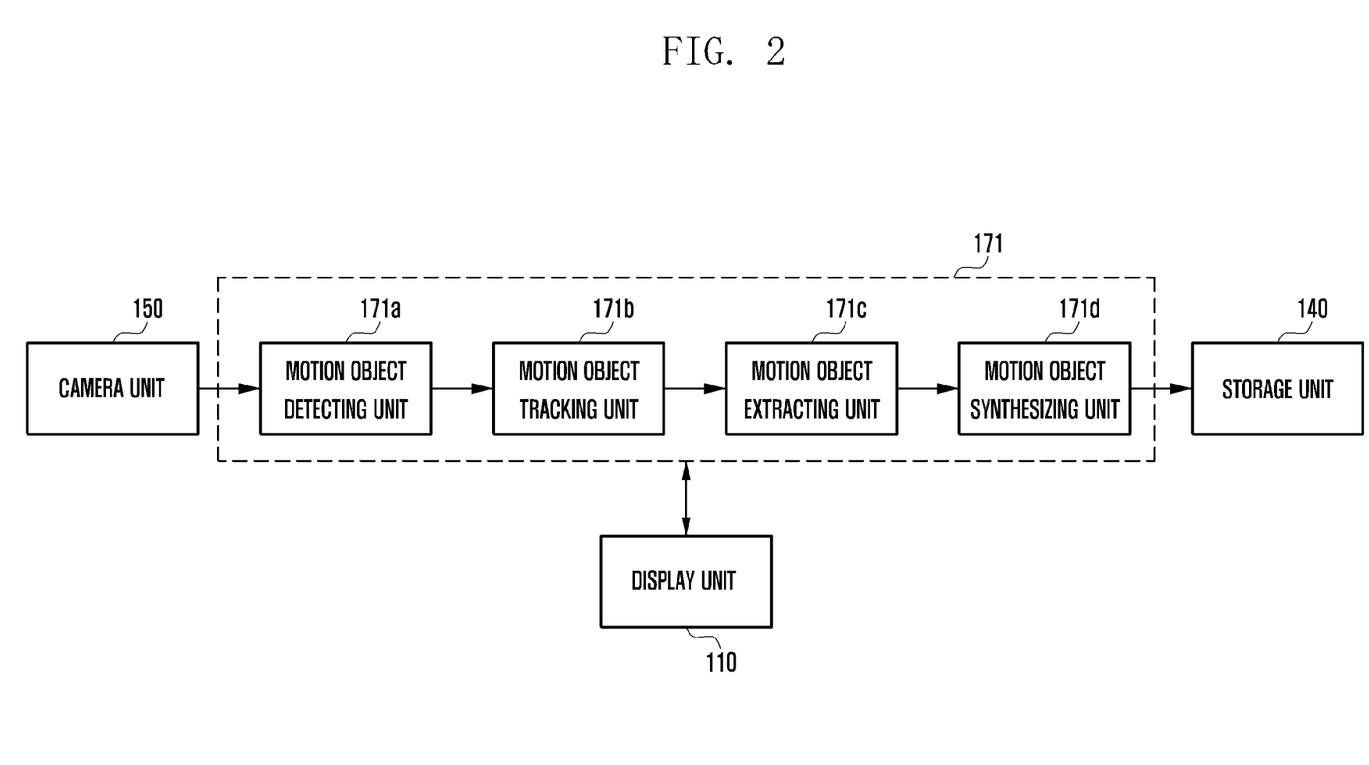
FIG. 2 is a block diagram illustrating the configuration of an image processing unit according to an embodiment of the present disclosure.

FIG. 2 is a block diagram illustrating the configuration of an image processing unit 171 according to an embodiment of the present disclosure.

Referring now to FIGS. 1 and 2, the control unit 170 and the image processing unit 171 will now be described. The image processing unit 171 may include a motion object detecting unit 171*a*, a motion object tracking unit 171*b*, a motion object extracting unit 171*c*, and a motion object synthesizing unit 171*d*.

The camera unit 150 transmits the acquired input image to the image processing unit 171 as image information. The image processing unit 171 detects at least one motion object from the image information that is acquired from the camera unit 150. The image processing unit 171 detects at least one moving object from the image information. In an embodiment, the motion object detecting unit 171*a* of the image processing unit 171 determines whether there is at least one moving object in the image information that is acquired from the camera unit 150, and detects the existence of the at least one moving object. Here, in determining the motion of the object using a motion vector, the motion object detecting unit 171*a* determines the object as being a motion object if the change amount of the vector (displacement and direction) of the object becomes equal to or larger than a specific value (e.g., threshold value). For example, if at least one of the displacement and the direction of the object is changed to be equal to or larger than the specific value, the motion object detecting unit 171*a* determines the object as being the motion object.

If the at least one motion object is detected, the image processing unit 171 tracks movement of the at least one motion object. If the at least one motion object is detected, the image processing unit 171 tracks the movement displacement and direction of the at least one motion object. In an embodiment, the motion object tracking unit 171*b* of the image processing unit 171 may track the displacement and the direction of the at least one motion object using a Kanade-Lucas-Tomasi (KLT) feature tracking method. In an embodiment, if a new motion vector is extracted in addition to the tracked object during tracking of the at least one motion object, the motion object tracking unit 171*b* then determines that the motion objects are separated from each other. In an embodiment, if a new moving object is sensed (e.g., if the number of objects in motion is increased) in addition to the object that is already being tracked in a tracking region during the tracking of the at least one motion object, the motion object tracking unit 171*b* may determine a corresponding time point as a time point when the motion objects are separated from each other. In an embodiment, if the motion vector is changed to be equal to or smaller than a specific value during the tracking of the at least one motion object, the motion object tracking unit 171*b* may determine that the motion objects are combined with each other. If the at least one motion object enters into a tracking region of another motion object (e.g., if the number of motion objects is decreased) during the tracking of the motion object, the motion object tracking unit 171*b* determines the corresponding time point as a time point when the motion objects are combined with each other.

With continued reference to FIG. 2, the image processing unit 171 may extract the at least one motion object being tracked. In an embodiment, the motion object extracting unit 171c of the image processing unit 171 may extract the motion object by frames (e.g., still image of the motion object) through determination of the vector of the at least one motion object being tracked.

The image processing unit 171 may synthesize the extracted motion objects. In an embodiment, if the separation or combination of the at least one motion object does not occur, the motion object synthesizing unit 171d may synthesize the movement of the motion objects in which the motion vector is changed to be equal to or larger than the specific value to generate one image. The motion object synthesizing unit 171d may synthesize the objects that did not move, but rather had a changed in direction (e.g. being standstill, for example, the objects of which the positions are located are not changed, but the directions are changed) to produce one image by making the moving objects overlap each other. When the motion object synthesizing unit 171d synthesizes the moving objects that change direction rather than move (e.g., the objects of which the positions are not changed, but the directions are changed) to produce one image by making the moving objects overlap each other, the motion object synthesizing unit 171d may synthesize respective frames with semi-transparency or blending. In this case, the degree of semi-transparency or blending of the respective frames of the image may be changed according to a weight (e.g., speed or time). The objects having moving positions may be synthesized to produce one image through making the objects not overlap (separated from) each other.

In an embodiment, if the separation or combination of the one motion objects occur, the motion object synthesizing unit 171d synthesizes the movement of the at least one motion object in which the motion vector is changed to be equal to or larger than the specific value to generate one image. The motion object synthesizing unit 171d may synthesize the objects that do not have a change in position, but the directions are changed) to produce one image by making the moving objects overlap each other. When the motion object synthesizing unit 171d synthesizes the moving objects that do not change position, but change direction) to produce one image by making the moving objects overlap each other, the motion object synthesizing unit 171d may synthesize respective frames with semi-transparency or blending. In this case, the degree of semi-transparency or blending of the respective frames of the image may be changed according to the weight (e.g., speed or time). The objects having the moving positions may be synthesized to produce one image through making the objects not overlap (separated from) each other. If there is a preset motion object synthesis sequence (e.g., if there is only motion object synthesis before a time point of the separation or combination of the at least one motion object, if there is only the motion object synthesis after the time point of the separation or combination of the at least one motion object, or if there is the motion object synthesis before and after the time point of the separation or combination of the at least one motion object), the motion object synthesizing unit 171d may synthesize the at least one motion object to produce one image according to the synthesis sequence.

If there is not the preset motion object synthesis sequence, the motion object synthesizing unit 171d may recommend the synthesis time point before and after the time point of the separation or combination of the at least one motion object. If a specific synthesis time point is selected from among the recommended synthesis time points, the motion object synthesizing unit 171d may synthesize the at least one motion object according to the selected synthesis time point.

The image processing unit 171 may transfer the synthesized image to the storage unit 140, and the storage unit 140 stores the transferred synthesized image under the control of the control unit 171. The image processing unit 171 may transfer detecting, tracking, and extracting processes of the motion objects to the display unit 110, and the display unit 110 may display the transferred detecting, tracking, and extracting processes of the motion objects. A user can confirm the detecting, tracking, and extracting processes of the motion objects as displayed on the display unit 110. The image processing unit 171 may transfer the synthesis time point of the motion object, a recommended screen of the synthesis time point, and the synthesized image to the display unit 110, and the display unit 110 may display the transferred synthesis time point of the motion object, the recommended screen of the synthesis time point, and the synthesized image.

Figure 3:
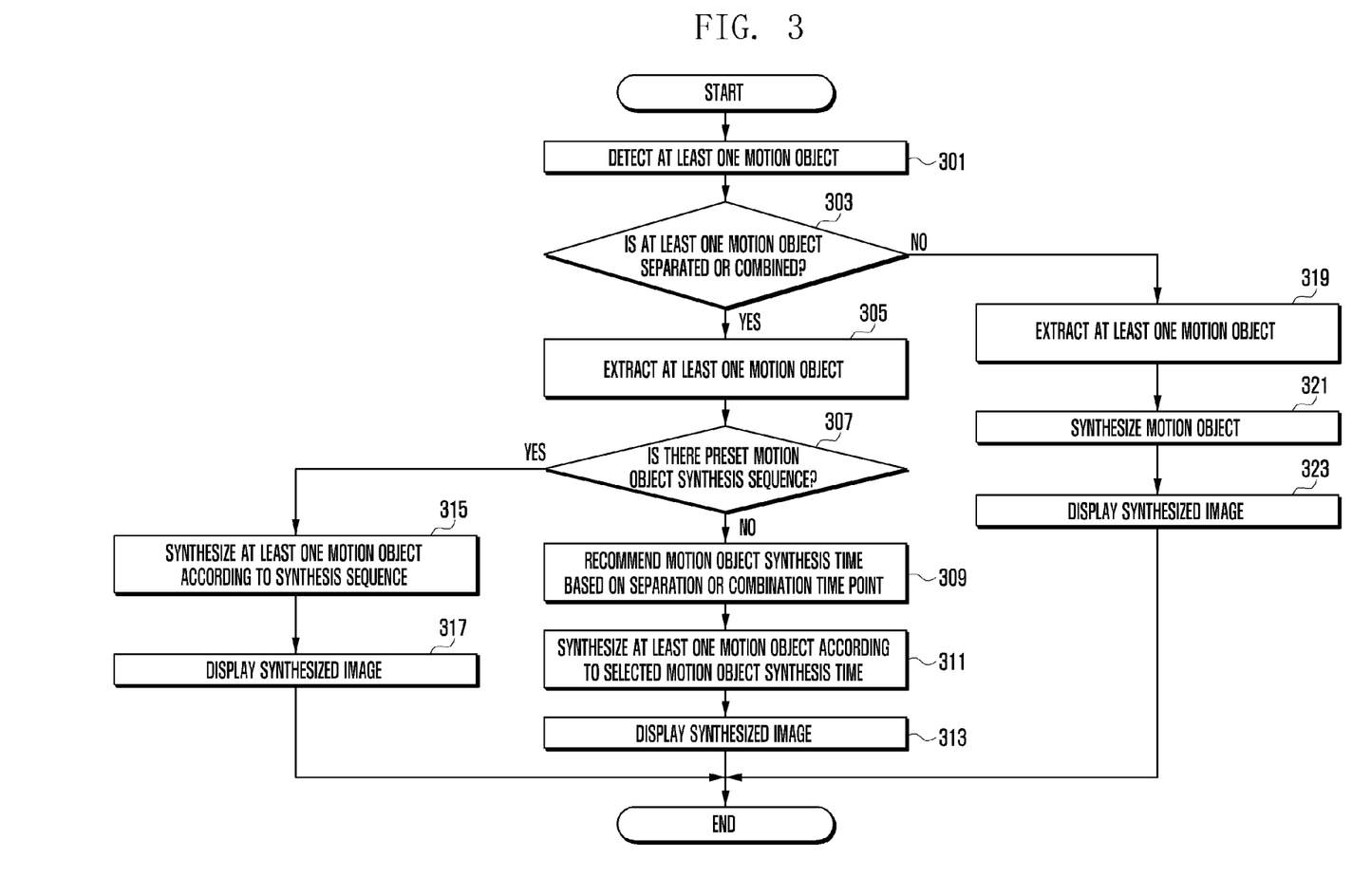
FIG. 3 is a flowchart illustrating one exemplary operation of a method for processing an image of an electronic device according to an embodiment of the present disclosure.

FIG. 3 is a flowchart illustrating a non-limiting exemplary operation of a method for processing an image of an electronic device 100 according to an embodiment of the present disclosure.

At operation 301, an electronic device 100 may detect at least one motion object from the image information that is acquired from the camera unit 150. At operation 301, the electronic device 100 may detect the at least one moving object from the image information. In an embodiment, at operation 301, the electronic device 100 may determine whether there is at least one moving object in the image information that is acquired from the camera unit 150, and may detect the existence of the at least one moving object. Here, in determining the motion of the object using a motion vector, at operation 301, the electronic device 100 may determine the object as a motion object if the change amount of the vector (displacement and direction) of the object becomes equal to or larger than a specific value (e.g., threshold value). For example, if at least one of the displacement and the direction of the object is changed to be equal to or larger than the specific value, at operation 301, the electronic device 100 may determine the object as the motion object to detect the motion object.

At operation 303, if the at least one motion object is detected, the electronic device 100 may track the movement of the at least one motion object, and in the case of two or more motion objects, may determine whether the motion objects are separated from or combined with each other. At operation 303, if the at least one motion object is detected, the electronic device 100 may track the movement displacement and direction of the at least one motion object, and may determine whether there are motion objects separated from or combined with each other. In an embodiment, at operation 303, the electronic device 100 may track the displacement and the direction of the at least one motion object using a Kanade-Lucas-Tomasi (KLT) feature tracking method. In an embodiment, if a new motion vector is extracted during tracking of the at least one motion object, at operation 303, the electronic device 100 may determine that the motion objects are separated from each other. In an embodiment, if a new moving object is sensed (e.g., if the number of motion objects is increased) in addition to the object that is tracked in the tracking region during the tracking of the at least one motion object, at operation 303, the electronic device 100 determines the corresponding time point as the time point when the motion objects are separated from each other. In an embodiment, if the motion vector is changed to be equal to or smaller than a specific value during the tracking of the at least one motion object, at operation 303, the electronic device 100 determines that the motion objects are combined with each other. If the at least one motion object enters into the tracking region of another motion object (e.g., if the number of motion objects is decreased) during the tracking of the at least one motion object, at operation 303, the electronic device 100 determines the corresponding time point as the time point when the motion objects are combined with each other.

At operation 305, if the motion objects are separated from or combined with each other, the electronic device 100 may extract the at least one motion object being tracked. In an embodiment, at operation 305, the electronic device 100 may extract the motion objects by frames (e.g., still image of the motion object) through determination of the vector of the at least one motion object being tracked.

At operation 307, there is a decision in which electronic device 100 may determine whether there is a preset motion object synthesis sequence (e.g., whether there is only motion object synthesis before a time point of the separation or combination of the at least one motion object, whether there is only the motion object synthesis after the time point of the separation or combination of the at least one motion object, or whether there is the motion object synthesis before and after the time point of the separation or combination of the at least one motion object) for the extracted motion object.

If at operation 307, there is not the preset motion object synthesis sequence, then at operation 309, the electronic device 100 may recommend the synthesis time point before and after the time point of the separation or the combination of the at least one motion object. In an embodiment, the synthesis time point that is recommended by the electronic device 100 may be at the time point when the objects are separated from or combined with each other, or may be a predetermined time point before and after the time point when the objects are separated from or combined with each other.

At operation 311, if a specific synthesis time point is selected from among the recommended synthesis time points, the electronic device 100 may synthesize the at least one motion object according to the selected synthesis time point. At operation 313, the electronic device 100 may display the synthesized image on the display unit 110.

However, with regard to operation 307, if there is the preset motion object synthesis sequence, then at operation 315, the electronic device 100 may synthesize the at least one motion object to produce one image according to the synthesis sequence. At operation 317, the electronic device 100 may display the synthesized image on the display unit 110.

Referring back to operation 303, if the motion objects are not separated from or combined with each other, then at operation 319, the electronic device 100 may extract the at least one motion object being tracked. In an embodiment, the electronic device 100 may extract the motion objects by frames (e.g., still image of the motion object) through determination of the vector of the at least one motion object being tracked. At operation 321, the electronic device 100 may synthesize the at least one motion object to produce one image. At operation 323, the electronic device 100 may display the synthesized image on the display unit 110.

Figure 4:
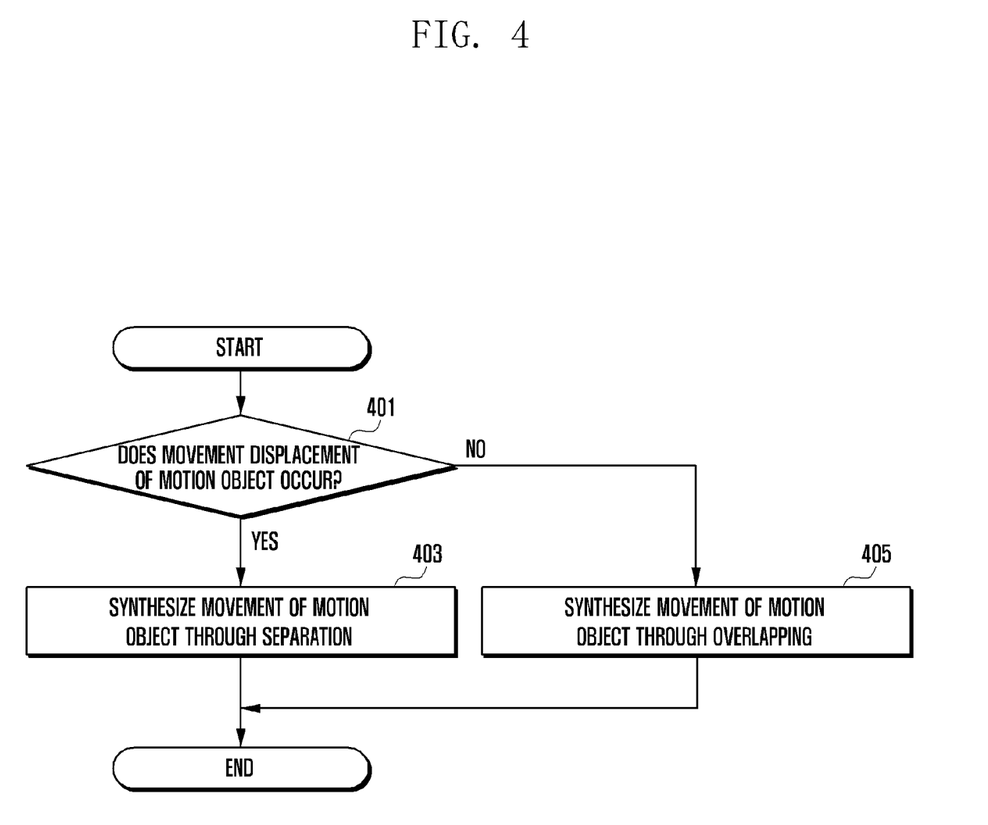
FIG. 4 is a flowchart illustrating another exemplary operation of a method for synthesizing motion objects of an electronic device according to an embodiment of the present disclosure.

FIG. 4 is a flowchart illustrating non-limiting exemplary operation of a method for synthesizing motion objects of an electronic device 100 according to an embodiment of the present disclosure.

At operation 401, the electronic device 100 determines whether the movement displacement of the motion object occurs. If the movement displacement of the motion object occurs, then at operation 403, the electronic device 100 may synthesize the objects of which the positions move to produce one image through non-overlapping (separation) of the objects of which the positions move.

If at operation 401, the movement displacement of the motion object does not occur, then at operation 405, the electronic device 100 may synthesize the images through overlapping of the movement of the motion objects. In an embodiment, if the movement displacement of the motion object does not occur, at operation 405, the electronic device 100 may synthesize the objects of which the positions are not changed, but the directions are changed, to produce one image by making the moving objects overlap each other. When the electronic device 100 synthesizes the moving objects that of which the positions are not changed, but the directions are changed to produce one image by making the moving objects overlap each other, at operation 405, the electronic device 100 may synthesize respective frames of the image with semi-transparency or blending. In this case, the degree of semi-transparency or blending of the respective frames of the image may be changed according to a weight (e.g., speed or time). The objects having moving positions may be synthesized to produce one image through making the objects not overlap (separated from) each other.

Figure 5:
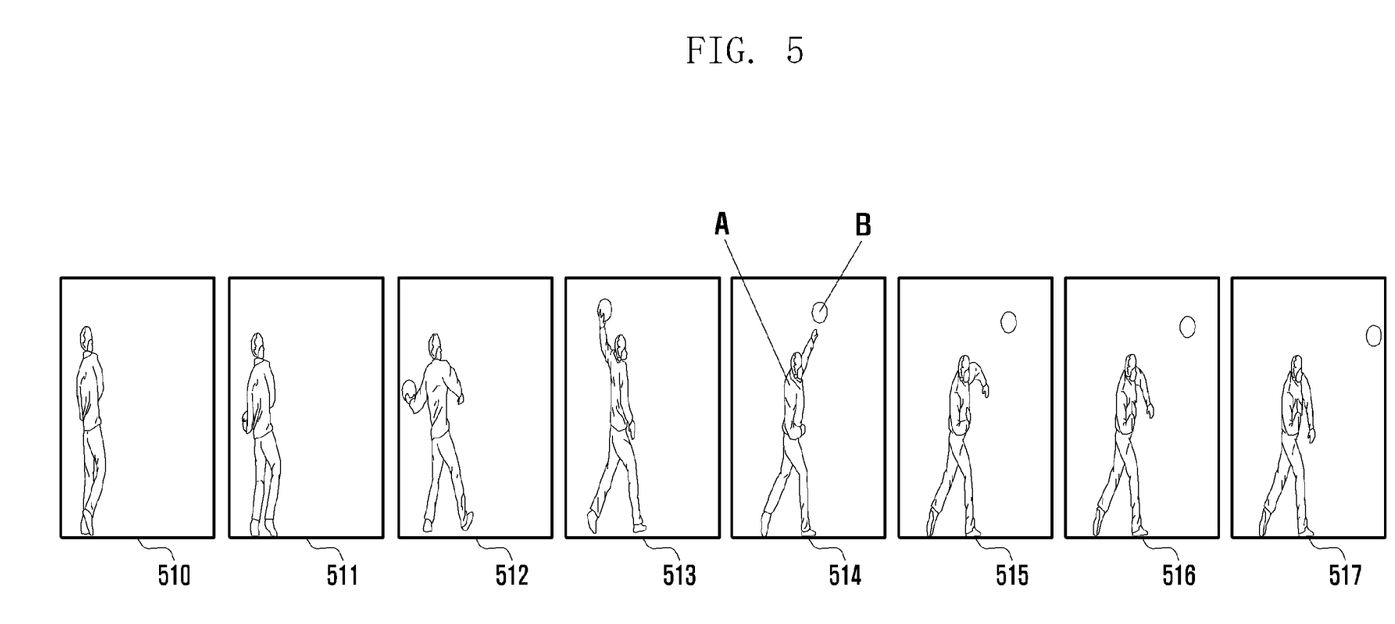
FIG. 5 is a diagram illustrating another exemplary operation of a method for processing an image of an electronic device according to an embodiment of the present disclosure.

FIG. 5 is a diagram illustrating a method for processing an image of an electronic device 100 according to an embodiment of the present disclosure.

FIG. 5 illustrates continuous scenes 510 to 517 in which a ball is thrown to illustrate a method for processing an image of an electronic device 100 according to an embodiment of the present disclosure. The electronic device 100 may track motion objects as shown as the continuous scenes 510 to 517 in which a person throws a ball. If it is assumed that a person is a motion object A and a ball is a motion object B (two motion objects), the electronic device 100 may sense the change of the motion vector in the scenes 510 to 514 in which only the motion object A is tracked and may track the movement of the motion object A and the motion object B as shown in the scene 514 in which the motion object A and the motion object B are separated from each other.

Figure 6:
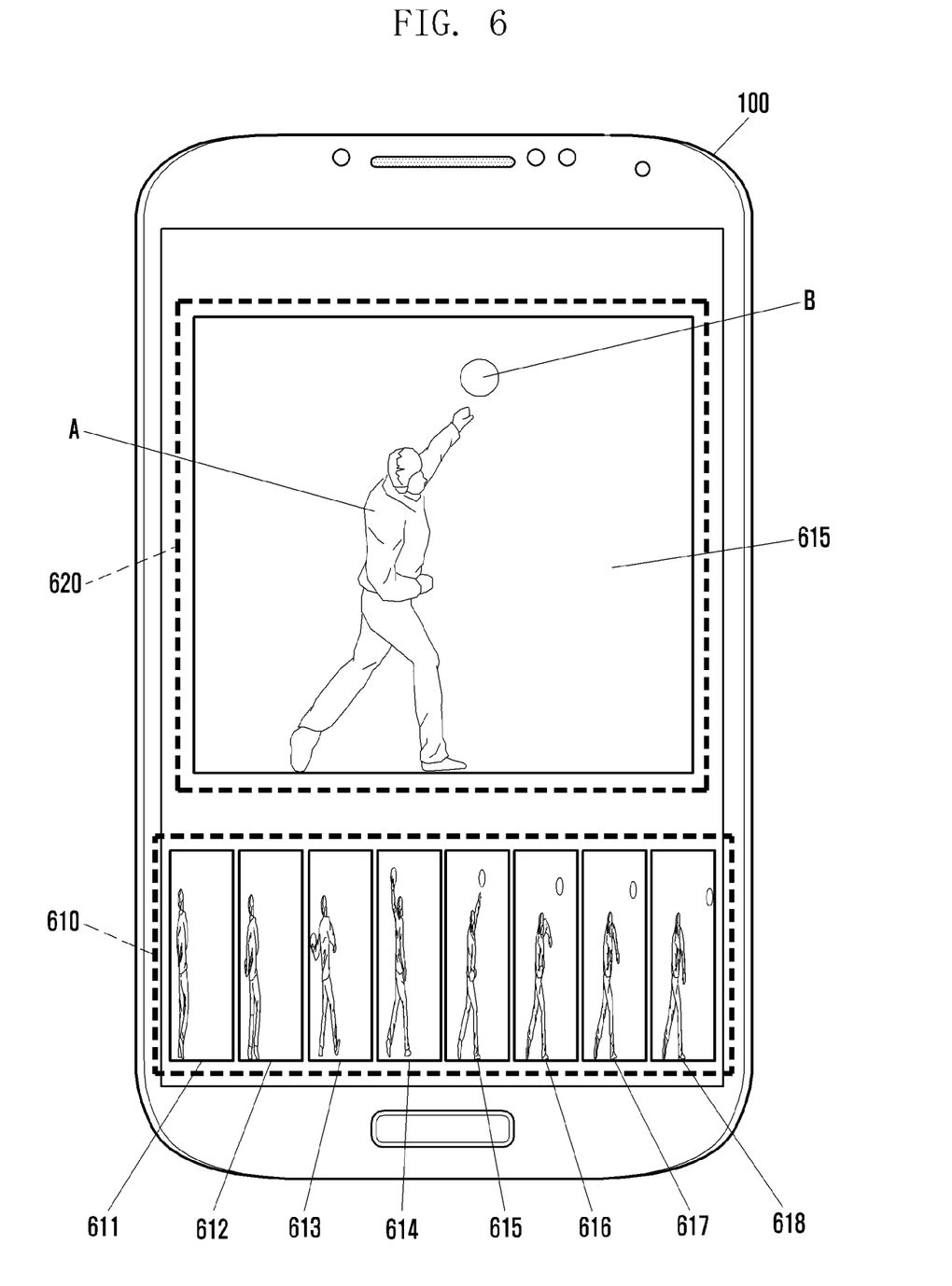
FIG. 6 is a diagram illustrating another exemplary operation of a method for processing an image of an electronic device according to an embodiment of the present disclosure.

FIG. 6 is a diagram illustrating a method for processing an image of an electronic device 100 according to an embodiment of the present disclosure. The electronic device 100 may display at least one synthesizing-time recommended user interface 610 and a selecting-time user interface 620. The synthesizing-time recommended user interface may continuously display the synthesis time points 611 to 618 through tracking of at least one motion object A and B so that a user can select the synthesis time point on the basis of the time point 615 when the two objects (motion object A and the motion object B) are separated from (or combined with) each other. If the user selects the time point 615 on the synthesizing-time recommended user interface 610, the electronic device 100 may display the selected synthesis time point on the selecting-time user interface 620.

Figure 7A:
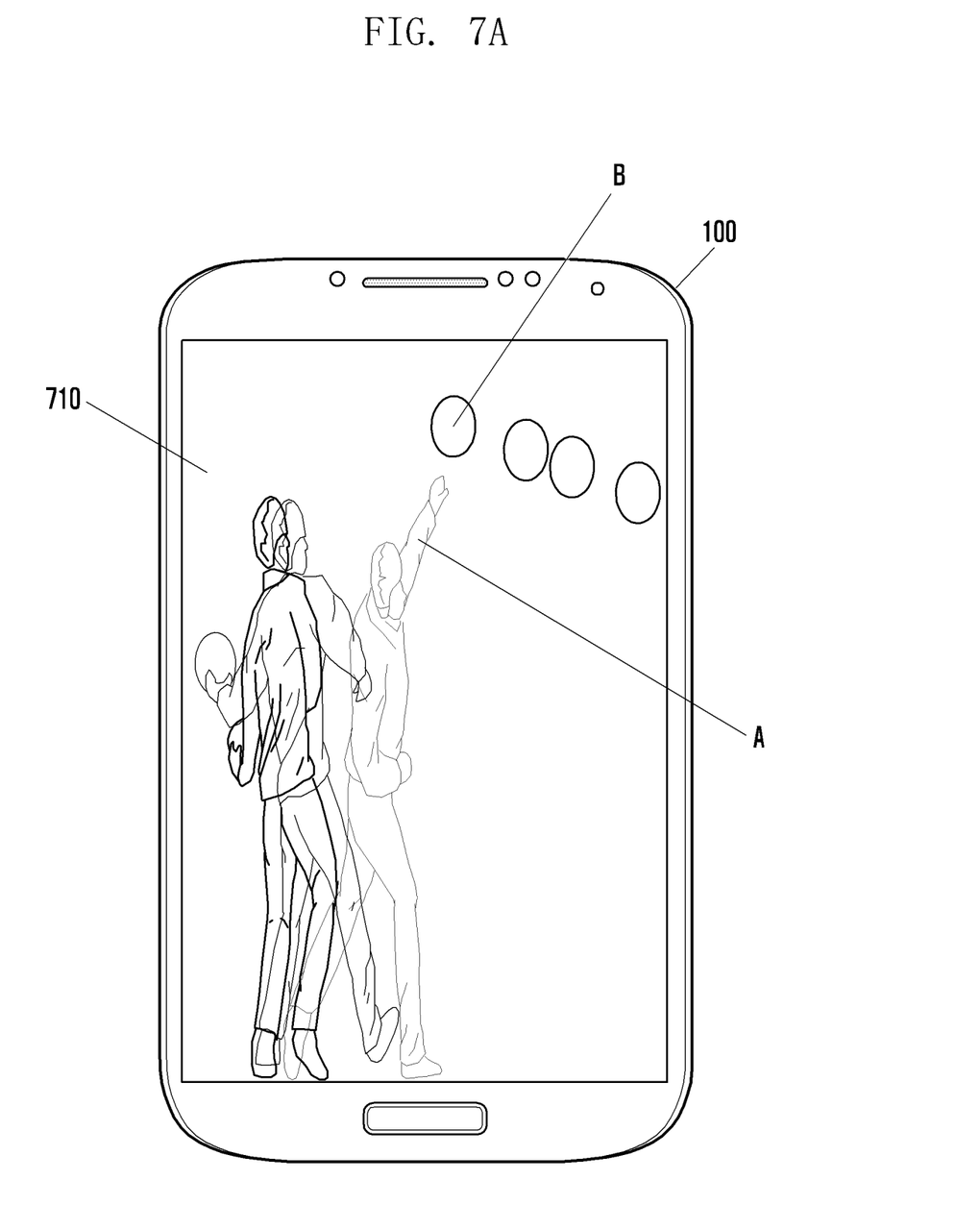
FIG. 7A and FIG. 7B are diagrams illustrating images synthesized by a method for processing an image of an electronic device according to an embodiment of the present disclosure.
Figure 7B:
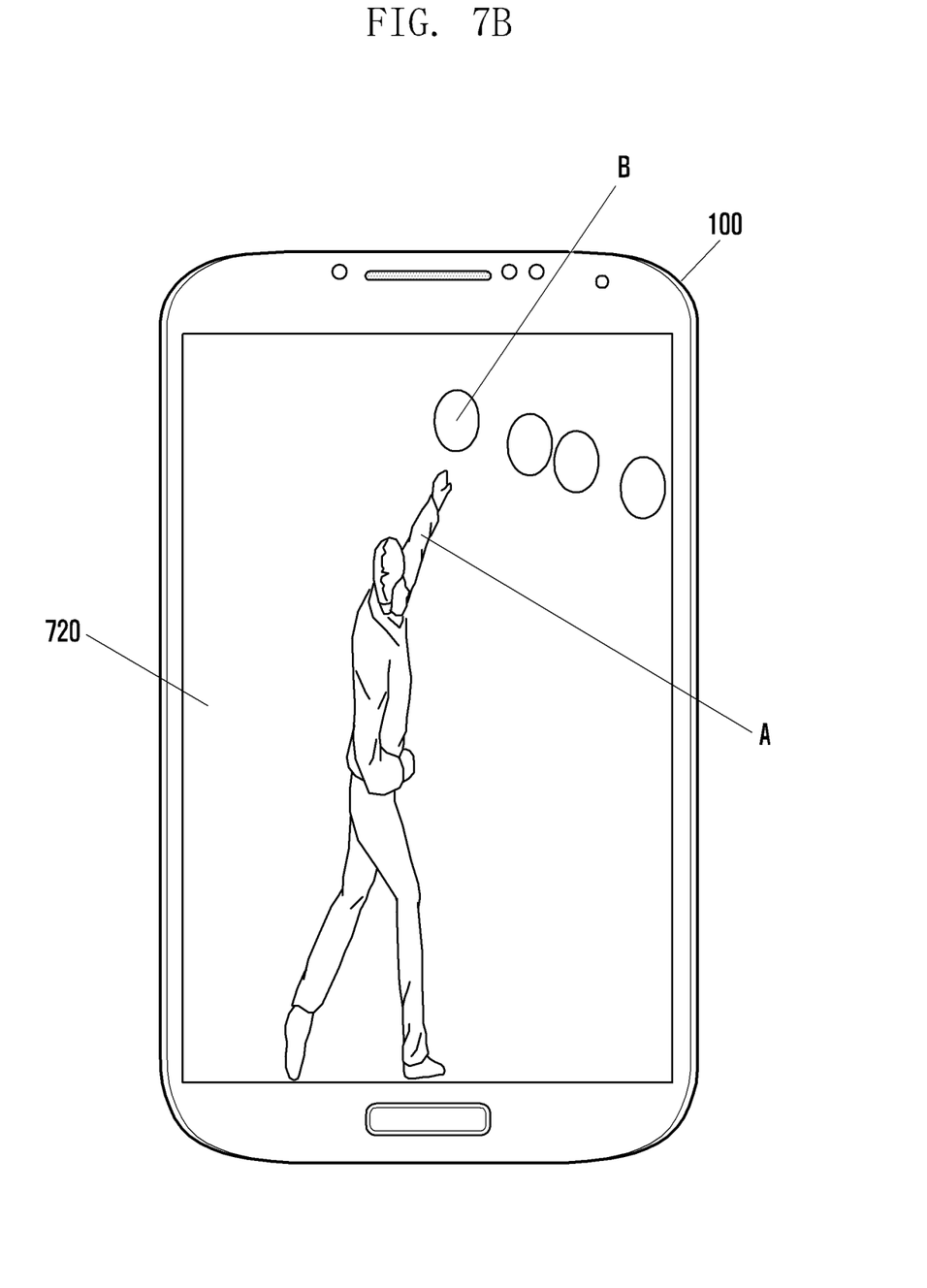

FIGS. 7A and 7B are diagrams illustrating images synthesized by a method for processing an image of an electronic device 100 according to an embodiment of the present disclosure.

In FIG. 7A, the electronic device 100 may synthesize the motion object A that undergoes directional change but not position change through overlapping, and may synthesize the motion object B that moves through non-overlapping (separation). Further, the electronic device 100 may synthesize the synthesized motion object A and the synthesized motion object B to produce one image (710). The electronic device 100 may synthesize the object that moves at a standstill (e.g., the object of which the position is not changed, but the direction is changed) through overlapping to produce one image, and may synthesize respective frames of the image with semi-transparency or blending.

In FIG. 7B, if the electronic device 100 recommends the synthesis time point, the user can select the synthesis time point. If the electronic device 100 recommends the synthesis time points of the motion object A and the motion object B based on the time point when the two motion objects (motion object A and the motion object B) are separated from each other, the user can select the synthesis time point. If the synthesis time point is selected, the electronic device 100 may synthesize the object whose position did not change, but whose direction did changed) through overlapping to produce one image according to the synthesis time point, and may synthesize the respective frames with semi-transparency or blending. The electronic device 100 may synthesize the motion object B that moves through non-overlapping (separation) to produce one image. The electronic device 100 may display the image of the synthesized motion object A and the image of the synthesized motion object B on one screen (720). Here, the synthesis time point that is recommended by the electronic device 100 may be the time point when the two or more objects are separated from or combined with each other or may be a predetermined time point before and after the time point when the two or more objects are separated from or combined with each other.

The apparatuses and methods of the disclosure can be implemented in hardware, and in part as firmware or as software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or other programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" or "microcontroller" constitute hardware in the claimed disclosure that contain circuitry that is configured for operation with software or firmware, and may be construed as implicitly including Digital Signal Processor (DSP) hardware. Under the broadest reasonable interpretation, the appended claims constitute statutory subject matter in compliance with 35 U.S.C. §101.

The definition of the terms "unit" or "module" as referred to herein is to be understood as constituting hardware circuitry such as a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and does not constitute software per se or pure software.

It will be understood that the above-described embodiments are exemplary to assist an artisan with an understanding of the contents of the present disclosure and do not limit the scope of the present disclosure. Accordingly, the scope of the present disclosure is defined by the appended claims, and it will be construed that all corrections and modifications derived from the meanings and scope of the following claims and the equivalent concept fall within the scope of the present disclosure.

What is claimed is:

1. A method for processing an image of an electronic device, comprising:
   detecting at least one first motion object from image information;
   determining whether the at least one first motion object is separated from or combined with a second motion object;
   extracting the at least one first motion object when the at least one first motion object is separated from or combined with the second motion object;
   determining whether or not there is a preset motion object synthesis sequence; and
   recommending a synthesis time point before and after a time point of separation or combination of the at least one first motion object,
   wherein the detecting of the at least one first motion object comprises determining an object from the image information as the at least one first motion object when a vector change amount of the object is changed to be equal to or larger than a specific value using a motion vector.

2. The method of claim 1, further comprising:
   selecting a specific synthesis time point from among the recommended synthesis time points;
   synthesizing the at least one first motion object according to the selected specific synthesis time point; and
   displaying the synthesized at least one first motion object as new image.

3. The method of claim 2, wherein when a movement displacement of the object does not occur, the synthesizing of the at least one first motion object comprises synthesizing the new image through overlapping of movement of the object, and when the movement displacement of the object occurs, synthesizing the new image through non-overlapping of the object.

4. The method of claim 3, wherein the synthesizing of the at least one first motion object comprises synthesizing respective frames of the image with semi-transparency, or synthesizing the new image through overlapping by blending, and wherein a degree of semi-transparency or blending of the respective frames of the new image is changed according to a weight.

5. The method of claim 1, further comprising:
   when the at least one first motion object is not separated from or combined with the second motion object, extracting the at least one first motion object;
   synthesizing the at least one first motion object to produce one image; and
   displaying the synthesized at least one motion object via the produced one image.

6. The method of claim 1, further comprising:
   when there is the preset motion object synthesis sequence, synthesizing the at least one first motion object to produce one image according to the synthesis sequence; and displaying the synthesized motion object via the produced one image, and when there is no preset motion object synthesis sequence, recommending by a control unit the synthesis time point before and after the time point of the separation or combination of the motion objects.

7. The method of claim 1, wherein the determining of whether the at least one first motion object is separated from or combined with the second motion object comprises determining that separation of the at least one first motion object and the second motion objects occurs when a new motion vector is extracted during tracking of the at least one first motion object.

8. The method of claim 7, wherein the determining of whether the at least one first motion object is separated from or combined with the second motion object comprises determining that combination of the at least one first motion object and the second motion objects occurs when the motion vector is changed to be equal to or smaller than the specific value during tracking of the at least one first motion object.

9. The method of claim 1, wherein the preset motion object synthesis sequence comprises at least one of:
   (1) a synthesis sequence that synthesizes only a preset motion object before a time point when the at least one first motion object is separated from or combined with the second motion object,
   (2) a synthesis sequence that synthesizes only a preset motion object after the time point when the at least one first motion object is separated from or combined with the second motion object, and
   (3) a synthesis sequence that synthesizes respectively the at least one first motion object and the second motion objects before and after the time point when the at least one a first motion object is separated from or combined with the second motion object.

10. An electronic device comprising:
   a camera unit that acquires and transmits an input image as image information;
   a control unit configured to:
      receive the image information and detect at least one first motion object from the image information,
      determine whether the at least one first motion object is separated from or combined with a second motion object,
      extract the at least one first motion object when the at least one first motion object is separated from or combined with the second motion object,
      determine whether or not there is a preset motion object synthesis sequence, and
      when there is a preset motion object synthesis sequence, synthesizes the at least one first motion object to produce one image according to the synthesis sequence, and
      when there is no preset motion object synthesis sequence, recommends a synthesis time point before and after the time point of the separation or combination of the at least one first motion object and the second motion objects; and
   a display unit that displays the synthesized at least one first motion object via the produced one image,
   wherein the detecting of the at least one first motion object comprises determining an object from the image information as the at least one first motion object when a vector change amount of the object is changed to be equal to or larger than a specific value using a motion vector.

11. The electronic device of claim 10, wherein the control unit selects a specific synthesis time point among the recommended synthesis time points, and synthesizes the at least one first motion object according to the selected specific synthesis time point.

12. The electronic device of claim 11, wherein the control unit produces the one image via synthesis including overlapping of movement of the at least one first motion object when a movement displacement of the at least one first motion object does not occur, and synthesis including non-overlapping of the at least one first motion object when the movement displacement of the at least one first motion object occurs.

13. The electronic device of claim 12, wherein the control unit synthesizes respective frames of the one image with semi-transparency or blending when synthesizing the one image through overlapping, and changes a degree of semi-transparency or blending of the respective frames of one the image according to a weight.

14. The electronic device of claim 10, wherein when the at least one first motion object is not separated from or combined with the second motion object, the control unit extracts the at least one first motion object, and synthesizes the at least one first motion object to produce the one image.

15. The electronic device of claim 10, wherein when there is the preset motion object synthesis sequence, the control unit synthesizes the at least one first motion object to produce the one image according to the synthesis sequence.

16. The electronic device of claim 10, wherein the control unit determines that separation of the at least one first motion object and the second motion objects occurs when a new motion vector is extracted during tracking of the at least one first motion object, and determines that a combination of the at least one first motion object and the second motion objects occurs when the motion vector is changed to be equal to or smaller than a specific value during tracking of the at least one first motion object.

17. The electronic device of claim 10, wherein the preset motion object synthesis sequence comprises at least one of:
   a synthesis sequence that synthesizes only the at least one first motion object before a time point when the at least one first motion object is separated from or combined with the second motion object,
   a synthesis sequence that synthesizes only the at least one first motion object after the time point when the at least one first motion object is separated from or combined with the second motion object, and
   a synthesis sequence that synthesizes respectively the at least one first motion object and the second motion objects before and after the time point when the at least one first motion object is separated from or combined with the second motion object.

\* \* \* \* \*